United States Patent [19]

Wingrove

[11] 3,833,005

[45] Sept. 3, 1974

[54] COMPARED COUNT DIGITALLY CONTROLLED PACEMAKER

[75] Inventor: Robert C. Wingrove, Circle Pines, Minn.

[73] Assignee: Medtronic, Inc., Minneapolis, Minn.

[22] Filed: July 26, 1971

[21] Appl. No.: 166,219

[52] U.S. Cl. .............................. 128/419 P, 128/422

[51] Int. Cl. .............................. A61n 1/36

[58] Field of Search ......... 128/419 C, 419 E, 419 P, 128/419 R, 421, 422; 307/220, 231; 340/146.2

[56] References Cited

UNITED STATES PATENTS

| | | | |
|---|---|---|---|
| 3,557,796 | 1/1971 | Keller, Jr. et al. | 128/419 P |
| 3,629,710 | 12/1971 | Durland | 307/220 X |
| 3,631,860 | 1/1972 | Lopin | 128/419 P |
| 3,662,758 | 5/1972 | Glover | 128/419 E |

*Primary Examiner*—William E. Kamm
*Attorney, Agent, or Firm*—Lew Schwartz; Wayne A. Sivertson

[57] ABSTRACT

A cardiac pacer having adjustable rate and/or pulse width controls controlled by digital means including a first counter for receiving information and storing the data, a second counter connected to clock means, and logic means for comparing the outputs of the first and second counters to determine pulse rate and width. The preferred embodiments of the digitally controlled pacer include means connected to the first counter for receiving coded set signals and rejecting noise and other interference signals. The preferred embodiment of a transmitter for sending coded signals to the pacer is also shown, the transmitter being digitally operable to provide coded bursts of RF pulses to the pacer receiver.

25 Claims, 4 Drawing Figures

INVENTOR.
Robert C. Wingrove
BY
Lew Schwartz
ATTORNEY

INVENTOR.
Robert C. Wingrove
BY
Lew Schwartz
ATTORNEY

INVENTOR.
Robert C. Wingrove
BY
Lew Schwartz
ATTORNEY

INVENTOR.
Robert C. Wingrove
BY
Lew Schwartz
ATTORNEY

COMPARED COUNT DIGITALLY CONTROLLED PACEMAKER

BACKGROUND OF THE INVENTION

Cardiac pacers and other implantable stimulation devices are well known by those reasonably skilled in the art. A search is continually under way to produce an improved device which has a simple programing capability for rate and amplitude control, for example, which has an input error protection to prevent noise signals from causing dangerous situations, which is safe, and which has as low as possible power consumption. The apparatus of this invention provides these and other advantages over the prior art by utilizing a digital approach to what has for the most part been done in analog circuitry in the prior art, and by providing circuits which can be reduced to integrated circuitry to thus provide a minimum power drain. Such advantages of a digital approach are known in the prior art, as for example U.S. Pat. No. 3,557,796.

SUMMARY OF THE INVENTION

Briefly described, the pacer apparatus of this invention includes a memory in the form of a first digital counter, and a second digital counter connected to continually count a digital clock. A first network of a logic circuitry interconnects the first and second counters for purposes of comparing outputs. When the output of the second digital counter is the same as that of a portion of the memory to which it is being compared, an output signal is provided from the logic circuitry. This output signal triggers a pacemaker output pulse which travels to electrodes adapted to be connected to the heart. The data for the memory is provided, in the preferred embodiment, through an RF receiver-filter which is connected to the memory through a decoder network. The decoder network or circuitry is provided to prevent the passage of extraneous 60 cycle noise signals and to prevent the passage of almost all conceivable noise signals. The pacer apparatus of this invention also includes further circuit means connected to the first counter and to the pacer output pulse circuitry for determining pulse width according to the information stored in the memory.

The coded RF input pulses are provided, in the preferred embodiment, by a transmitter which includes yet another digital counter, the outputs of which are selectable to provide the desired data to the memory in the pacer apparatus. The selected data is transmitted in coded form automatically by the transmitter.

DESCRIPTION OF THE PREFERRED EMBODIMENTS

Figure 1:
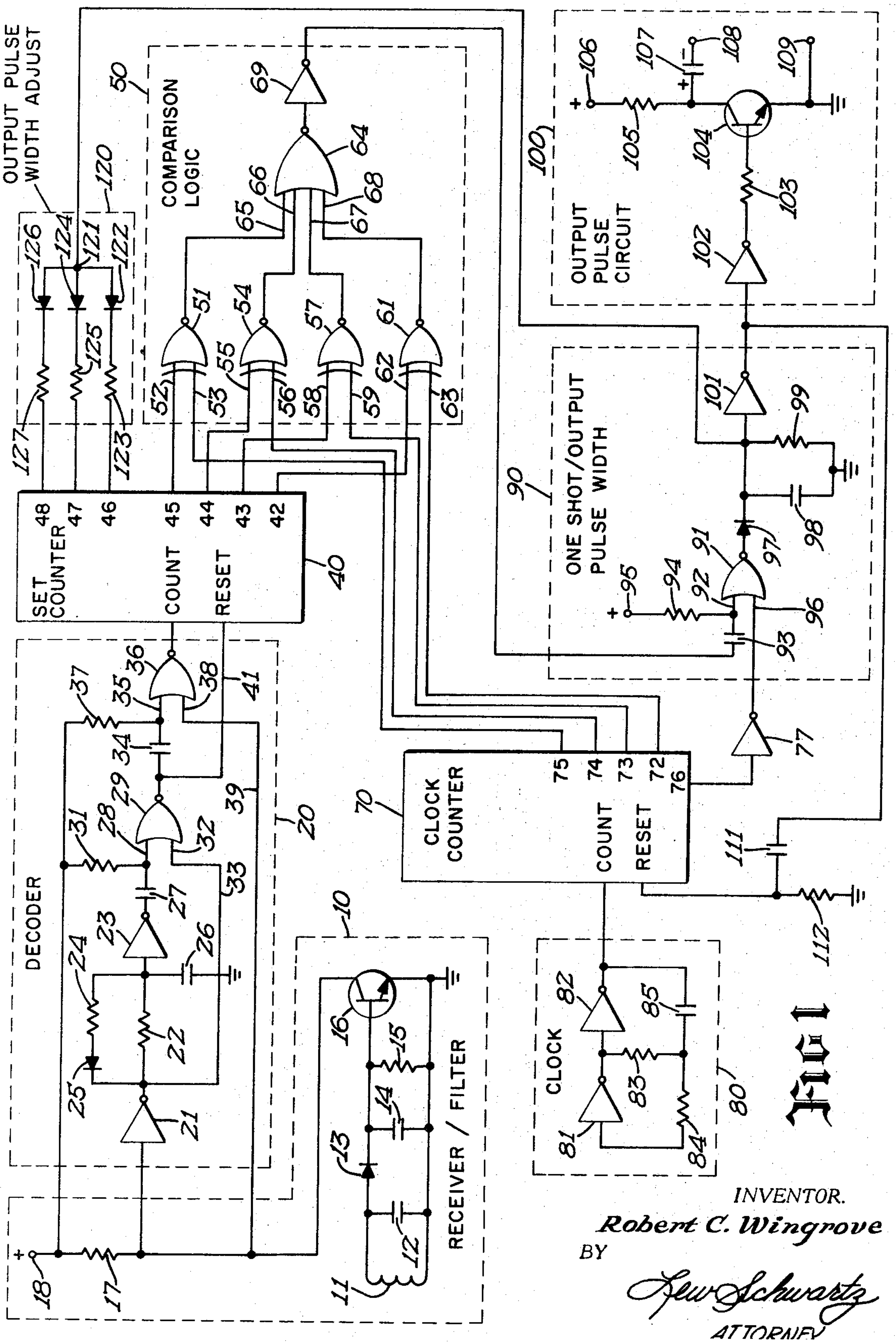
FIG. 1 is a schematic diagram of the digital pacemaker apparatus of this invention.

Referring now to FIG. 1 there is shown a receiver-filter 10 comprising a coil 11 across which is connected a capacitor 12. A diode 13 and a capacitor 14 are connected in series across capicitor 12. A resistor 15 is connected across capacitor 14. A transistor 16 has its base connected to one side of resistor 15 and its emitter connected to the other side of resistor 15. The emitter of transistor 16 is also connected to ground, while the collector of transistor 16 is connected through a resistor 17 to a positive power input terminal 18.

There is also shown a decoder 20 which is used to greatly decrease the likelihood of extraneous noise signals affecting the pacer. Decoder 20 includes an inverter 21 which has an input connected to the collector of transistor 16. The output of inverter 21 is connected through a resistor 22 to the input of another inverter 23. A resistor 24 and a diode 25 are connected in series across resistor 22. The input of inverter 23 is also connected through a capacitor 26 to ground. The output of inverter 23 is connected through a capacitor 27 to an input 28 of a two-input positive nor logic gate 29. Input 28 of gate 29 is also connected through a resistor 31 to power input terminal 18. The other input 32 of gate 29 is connected by a lead 33 to the output of inverter 21. The output of gate 29 is connected to a capacitor 34 to an input 35 of another two-input positive nor logic gate 36. Input 35 is also connected to a resistor 37 to power input terminal 18. The other input 38 of gate 36 is connected by a lead 39 to the collector of transistor 16.

In FIG. 1 there is also shown a set counter 40 for receiving the decoded external signal. The output of gate 36 is connected to the count input terminal of counter 40, which is connected as a digital counter having a plurality of outputs including outputs 42, 43, 44, 45, 46, 47, and 48. A reset terminal of counter 40 is connected through a line 41 to the output of gate 29.

There is also shown a comparison logic circuit 50, comprising four two-input exclusive or gates 51, 54, 57 and 61 as well as four-input positive nor logic gate 64 and an inverter 69. An input 52 of gate 51 is connected to counter output terminal 45. An input 55 of gate 54 is connected to counter output terminal 44. An input 58 of gate 57 is connected to counter output terminal 43. An input 62 of gate 61 is connected to counter output terminal 42. The output of gate 51 is connected to an input 65 of gate 64. The output of 54 is connected to an input 66 of gate 64. The output of gate 57 is connected to an input 67 of gate 64. The output of gate 61 is connected to an input 68 of gate 64. The output of gate 64 is connected to the input of inverter 69.

There is also shown a clock counter 70 which has a plurality of count output terminals including terminals 72, 73, 74, 75 and 76. Terminal 72 is connected to an input 63 of gate 61. Terminal 73 is connected to an input 59 of gate 57. Terminal 74 is connected to an input 56 of gate 54. Terminal 75 is connected to an input 53 of gate 51.

There is also shown in FIG. 1 a clock 80 comprising a pair of inverters 81 and 82. The output of inverter 81 is connected to the input of inverter of 81 by a pair of serially connected resistors 83 and 84, and is connected directly to the input of inverter 82. The output of inverter 82 is connected to the input of 82 through the serially combination of a capacitor 85 and resistor 83, and is directly connected to a count input terminal of clock counter 70.

There is also shown a one-shot multivibrator 90. Multivibrator 90 includes a two-input positive nor logic gate 91 having a first input 92 which is connected through a capacitor 93 to the output of inverter 69, and which is connected through a resistor 94 to a positive power input terminal 95. Output terminal 76 of counter 70 is connected to the input of an inverter 77 which has an output connected to another input 96 on gate 91. The output of 91 is connected through a diode 97 to the input of an inverter 101. The input of inverter 101 is connected to ground through a parallel combination of a capacitor 98 and a resistor 99. The output of inverter 101 is connected through a capacitor 111 to a reset input terminal on counter 70. The reset counter terminal of counter 70 is also connected to ground through a resistor 112.

There is also shown a pacer output pulse circuit 100. Circuit 100 includes an inverter 102 which has its input connected to the output of inverter 101 and its output connected through a resistor 103 to the base of a transistor 104. The collector of transistor 104 is connected through a resistor 105 to a power input terminal 106, and is connected through a capacitor 107 to an electrode terminal 108. The emitter of transistor 104 is connected to ground, and to an elecrode terminal 109. Electrode terminals 108 and 109 are adapted to be connected to electrodes which are in turn adapted to be connected to the heart.

In FIG. 1 there is also shown output pulse width adjustment circuitry 120. Circuitry 120 includes a junction 121 connected through a serial combination of a diode 122 and a resistor 123 to terminal 46 of counter 40. Junction 121 is also connected through a serial combination of a diode 124 and a resistor 125 to counter output terminal 47, and through a serial combination of a diode 126 and resistor 127 to counter output terminal 48. Junction 121 is also connected to the input of inverter 101.

Figure 2:
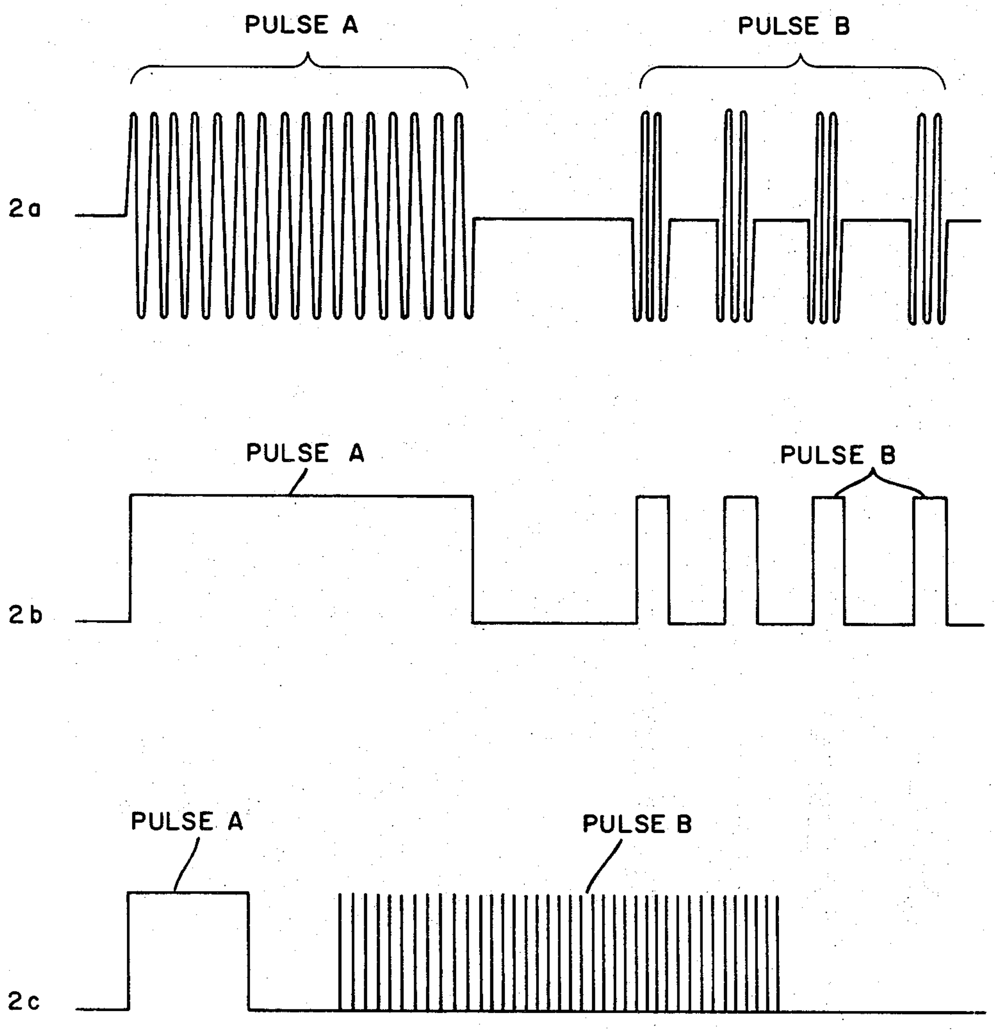
FIGS. 2*a*, *b*, and *c* comprise graphs of the coded pulse input to the apparatus of FIG. 1 for providing data to the memory.

In FIG. 2 there are shown three graphs, *a*, *b* and *c* relative to the input signal to the pacer of FIG. 1. In graphs *a* and *b* it can be seen that the pulses for setting counter 40, pulses B, are preceded by a longer pulse A which is of a coded pulse width. Pulses A and B as received at receiver 10 comprise a burst of radio frequency pulses transmitted from a transmitter such as that shown in FIG. 3.

The burst of pulses comprising pulse A of graph *a* is received across coil 11 and capacitor 12, and the radio frequency components are filtered out by diode 13 and capacitor 14 such that pulse A of graph *b* is seen across resistor 15 to turn on transistor 16. The output of transistor 16 is felt at the input of inverter 21 and on input 38 of gate 36. Gate 36 has an output which is normally ZERO which will not change at this instant in time inasmuch as input 35 of positive nor gate 36 is held at a ONE due to the charge on capacitor 34. However, the input signal pulse A felt at the input to inverter 21 will cause its normally ZERO output to change to a ONE. The input of inverter 23 will not, however, ever, instantaneously change to a ONE, because of the charge time of capacitor 26 through resistor 22. Therefore, the output of inverter 23 will remain a ONE until a minimum time has passed for the charging of capacitor 26. This minimum time is set to be slightly less than the total time that input pulse A is present. Thus, pulses having a pulse width less than the minimum time set by resistor 22 and capacitor 26 will not affect the pacer operation.

After the minimum time has elapsed capacitor 26 will have charged sufficiently to cause the output of inverter 23 to go to ZERO. The switch of the output of inverter 23 from ONE to ZERO will cause capacitor 27 to commence charging through resistor 31. During the time of charge of capacitor 27, input 28 of gate 29 will temporarily be at the ZWEO level for a predetermined time. This predetermined period sets the maximum time for the coded signal A to affect the pacer. The output of inverter 21 is also felt on input 32 of gate 29 and as long as that output is a ONE, there will be no signal at the output of gate 29. However, if the output of inverter 21 changes back to a ZERO (input signal A ceases) during the predetermined time of the charge of capacitor 27, then the output of gate 29 will change to a ONE. Thus, if an extraneous noise signal occurs which is longer than the minimum time determined by capacitor 26 it may not be longer than the maximum time determined by capacitor 27 or it will still not affect the pacer. Input pulse A, as shown in graphs *a* and *b* is selected to end between the maximum and minimum times.

As stated above, when Pulse A ends the output of gate 29 will change from ZERO to ONE. This is felt through line 41 to reset counter 40, and will cause the discharge of capacitor 34 thus putting a temporary ZERO pulse on input 35 of gate 36. Input 35 will remain ZERO during the recharge time of capacitor 34 after input pulse A ends. This second predetermined period of time is selected to be just sufficient to open gate 36 for a period of time sufficient to put in the maximum number of count pulses to digital counter 40. As can be seen from graphs *a*, *b* and *c*, a plurality of count signals are transmitted, the number being determined by setting the transmitter, which are felt through receiver 10 on input 38 of gate 36 through line 39. As the input pulses change from ZERO to ONE state, the output of gate 36 will also change from state to state causing a counting of the pulses in counter 40. When the recharge of capacitor 34 has been accomplished, gate 36 will be shut off and the counting will end. The counted pulses will appear on count output terminals 42–45, which are connected, respectively, to one input on each of gates 51, 54, 57 and 61.

Clock 80 is continually sending a series of pulses to counter 70, and the count is appearing on terminals 72-75 which are also connected to gates 51, 54, 57 and 61. The output of gate 64 is normally a ZERO. However, when all four output terminals 42–45 of counter 40 match the respective output terminals 72–75 of counter 70 then each of the outputs of gates 51, 54, 57 and 61 will go to ZERO, thus causing all four inputs 65–68 of gate 64 to go to ZERO and causing the output of gate 64 to go to a ONE. This ONE is felt at the input of inverter 69 causing it to change to an output of ZERO, which output will be felt at the input to multivibrator 90.

As inverter 69 changes its output to ZERO, the changing pulse will be differentiated by capacitor 93 and resistor 94 to cause the leading edge to present a ZERO to input 92 of gate 91 thus enabling half of gate 91. However, the output of gate 91 will not change to a ONE unless input 96 is also at a ZERO. Input 96 will be held at a ONE by the output of inverter 77 as long as output terminal 76 of counter 70 is a ZERO. By selecting terminal 76 to represent the next count after the highest represented by terminals η–75 (for example, if terminal 75 represents the "8" count then terminal 76 is selected to represent "16" count of the digital counter 70) a minimum rate for the pacer output pulse can be established. It is therefore apparent that the first time that a pulse charge appears at the output of inverter 69, the leading edge of which is felt at input 92 of gate 91, there will be no change at the output at gate 91. However, the second time that terminals 72–75 of counter 70 match terminals 42–45 of counter 40 terminal 76 will have been switched to a ONE and input 96 at gate 91 will be disabled. Therefore, the second output of inverter 69 will cause at its leading edge, the output of gate 91 to change to a ONE. This change will be felt through diode 97 to commence the charge of capacitor 98 causing inverter 101 to have an output switch from the ONE to the ZERO state, representing the output of multivibrator 90. The time which the output of multivibrator 90 remains on and determined by the parallel combination of capacitor 98 and resistor 99, thus giving a predetermined output pulse width to the pacer output pulse. The output of multivibrator 90 is felt at inverter 102 to cause its output to go to a ONE. This causes the turn on of transistor 104 and thus causes an output pulse to be applied to electrode terminals 108 and 109 which will be felt at the heart.

The output of multivibrator 90 is also felt through the combination of capacitor 111 and resistor 112 on the reset terminal of counter 70, such that the trailing edge of the output of inverter 101 causes a reset of counter 70. This reset will clear all of output terminals 72–76, thus disabling gate 91 and commencing the count cycle.

Thereafter, clock 80 will again cause counter 70 to receive pulses which will eventually again cause terminal 76 to be in the ONE state at the same time that output terminals 72–75 match the respective of output terminals 42–45 of counter 40. The number of pulses necessary to reach this state thus determined the rate at which pacer output pulses are provided to the heart. The count in set counter 40 will remain the same unless the operator uses the transmitter to set another count in counter 40, thus changing the rate. As has been pointed out above, only extraneous noise signals which coincidentally fall between the minimum and maximum times determined by the decoder 20 can enable the input to counter 40, and even should such a pulse occur the count will change only if this noise signal is followed by pulses which are completed during the time period determined by the charge time of capacitor 34. As most extraneous noise signals are of the 60 cycle per second variety, times have been selected which will prevent any reasonable possibility of such noise signals from changing the count in set counter 40 and thus affect the pacer rate. For example, pulse A has been selected to be 13 milliseconds to fall between a maximum and minimum gate time of 11 to 15 milliseconds as determined by capacitors 26 and 27 respectively. Thereafter, a maximum number of 127 pulses such as pulses B are completed within approximately 40 milliseconds, the pulses being approximately 100 microseconds wide with a repetition rate of approximately 250 microseconds.

Referring again to FIG. 1 a variation of the apparatus of this invention can be seen with regard to output pulse width adjustment apparatus 120. As has been explained above, the output pulse width is determined by the pulse time of multivibrator 90. The pulse time of one-shot multivibrator 90 is in turn determined by the parallel combination of capacitor 98 and resistor 99. Resistors 123, 125 and 127 have been provided so that the operator of the transmitter may select the output pulse width he desires by changing the oount in counter 40. Wehn any of output terminals 46, 47 or 48 are in the ZERO state then the respective of resistors 123, 125 and 127 will be in parallel with resistor 99. Thus, the operator may select an input count which, in addition to determining the rate by setting the states of terminals 42–45, will in addition set the states of terminals 46–48 to vary the resistance in multivibrator 90 to vary the output pulse width of the entire pacer. Diodes 122, 124 and 126 are provided to prevent a current flow into capacitor 98 when the respective of terminals 46, 47 and 48 are in the ONE state.

Figure 3:
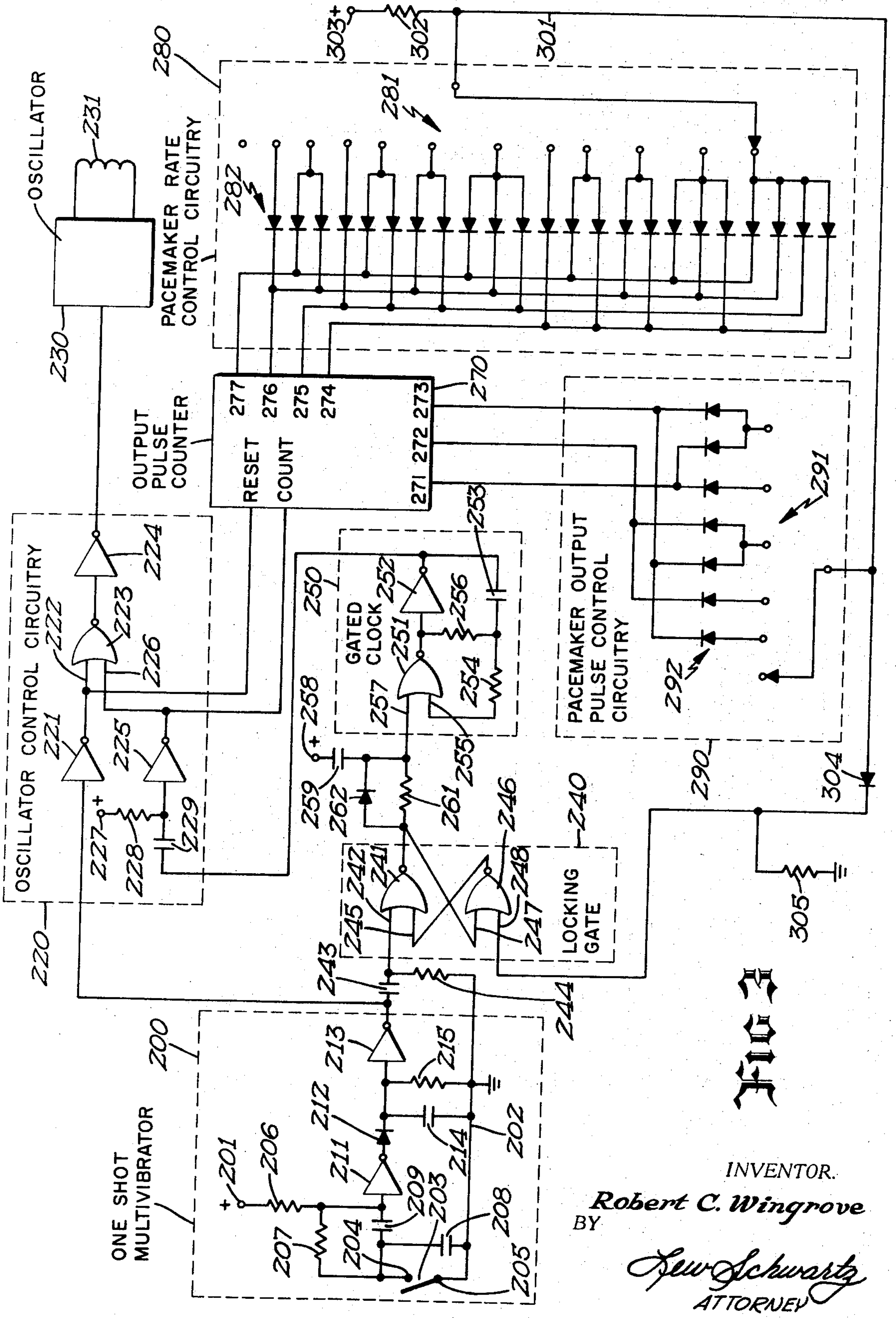
FIG. 3 is a schematic diagram of the transmitter apparatus of this invention which provides data to the apparatus of FIG. 1.

Referring now to FIG. 3, there is shown a transmitter which may be used to provide coded input information to the digitally controlled pacer of FIG. 1. In FIG. 3 there is shown a one-shot multivibrator 200. Multivibrator 200 includes a positive power input terminal 201 and a ground bus 202. A switch 203 has a first terminal 204 and a second terminal 205. Power terminal 201 is connected through a serial combination of a resistor 206 and a resistor 207 to terminal 204. Terminal 205 is connected to bus 202. A capacitor 208 is connected between terminals 204 and 205. Another capacitor 209 is connected from terminal 204 to the input of an inverter 211. The input of inverter 211 is also connected to a junction between resistors 206 and 207. The output of resistor 211 is connected through a diode 212 to another inverter 213. A parallel combination of a capacitor 214 and a resistor 215 is connected between the input of inverter 213 and bus 202.

In FIG. 3 there is also shown oscillator control circuitry 220. Circuitry 220 includes an inverter 221 which has an input connected to the output of inverter 213 and an output connected to an input 222 of a two-input positive NOR logic gate 223. The output of gate 223 is connected to the input of another inverter 224. Yet another inverter 225 has an output connected to an input 226 of gate 223. Inverter 225 has its input connected to a positive power input terminal 227 through a resistor 228. The input of inverter 225 is also connected to one side of a capacitor 299.

There is also shown an oscillator 230 which has an input connected to the output of inverter 224 and an output connected to a transmitting coil 231. Coil 231 is adapted to transmit signals that will be received by coil 11 of receiver filter 10 described in the discussion of FIG. 1 above.

FIG. 3 also discloses a locking gate 240 which includes a two-input positive NOR logic gate 241. Gate 241 has an input 242 connected through a capacitor 243 to the output of inverter 213, and connected to a resistor 244 to bus 202. Another two-input positive NOR logic gate 246 has an input 247 connected to the output of gate 241. The output of gate 246 is connected to an input 245 on gate 241.

There is also shown a gated clock 250. Cock 250 has a two-input positive NOR logic gate 251 which has an output connected to the input of an inverter 252. The output of inverter 252 is connected to the other plate of capacitor 229 and by a serial combination of a capacitor 253 and a resistor 254 to an input 255 of gate 251. A resistor 256 is connected from a junction between capacitor 253 and resistor 254 to the input of inverter 252. Another input 257 of gate 251 is connected to a positive power input terminal 258 through a capacitor 259. Input 257 is also connected through a resistor 261 to the output of gate 241. A diode 262 is connected across resistor 261.

FIG. 3 also shows an output pulse counter 270. Counter 270 has a reset input terminal connected to the output of inverter 221, and a count input terminal connected to the output of invertor 225. Counter 270 also has a plurality of output terminals 271, 272, 273, 274, 275, 276 and 277.

Also shown in FIG. 3 is a pacer rate control circuitry 280. Circuitry 280 includes a multi-positional switch 281 and a plurality of diodes such as 282 connected in a predetermined sequence to output terminals 274, 275, 276, 277 on counter 270.

Also shown is a pacer output pulse control circuitry 290 which includes a multi-positional switch 291 and a plurality of diodes such as 292 connected in a predetermined configuration to output terminals 271, 272, 273 on counter 270.

The wiper arms of switches 281 and 291 are connected to a bus 301. Bus 301 has a first end connected through a resistor 302 to a positive power input terminal 303. A second end of bus 301 is connected to the anode of the diode 304. The cathode of diode 304 is connected to ground through a resistor 305 and to an input 248 on gate 246.

The operation of the transmitter of FIG. 3 is commenced by the closure of switch 203 which may be accomplished either manually or automatically. This causes the input of inverter 211 ot go to a ZERO. The input of inverter 211 had been at a ONE due to the effect of the RC network comprising resistors 206 and 207 and capacitors 208 and 209, being connected between bus 202 and positive input terminal 201. This change from ONE to ZERO of the input of inverter 211 will cause its output to change from a ZERO to a ONE. This will be felt through diode 212 across the parallel RC network comprising capacitor 214 and resistor 215, and on the input of inverter 213. The output of inverter 213 will therefore change from a ONE to a ZERO and remain a ZERO for a time determined by the RC time constant of capacitor 214 and resistor 215. This time is chosen to be the pulse width A shown in FIG. 2*a* and *b*, which in the specific configuration mentioned above would be 13 milliseconds to fall between the gated on time of 11 to 15 milliseconds provided in decoder 20 described in the above discussion of FIG. 1.

When the output of inverter 213 goes to ZERO this change will be felt on the input of inverter 221 of oscillator control circuitry 220. This will cause an output change from ZERO to ONE at inverter 221 thus causing a positive signal to appear at input 222 of gate 223. The output ONE at inverter 221 is also felt at the reset terminal of counter 270 to reset all of its output terminals to ZERO. The positive input will cause positive NOR logic gate 223 to have an output change from ONE to ZERO. This change will be felt at the input of inverter 224 causing its output to go from ZERO to ONE. The positive going signal at the output of inverter 224 will turn on oscillator 230 thus causing a burst of pulses to appear on coil 231. The oscillator 230 will remain on until the output signal of one-shot multivibrator 200 returns to its original state, in the manner described above. Thus, the output of inverter 213 will return to ONE, the output of inverter 221 will return to ZERO, which change will be felt on the input of gate 223 causing it to return to ONE state, thus causing the output of inverter 224 to return to the ZERO state to shut off oscillator 230. It will thus be apparent that the burst of pulses on coil 231 will be present for a period of time determined by multivibrator 200, to produce the coded burst of pulses shown at A in FIG. 2 *a*.

The trailing edge of the output pulse from multivibrator 200, that is the return of the output of inverter 213 to the ONE state, will be felt across a differentiator comprising capacitor 243 and resistor 244 thus causing a positive signal to appear at input 242 of gate 240. This positive input will cause positive NOR logic gate 241 to change its output from a ONE to a ZERO. This change is felt at input 247 of gate 246 causing its output to change from a ZERO to a ONE. This positive output of gate 246 is connected to input 245 of gate 241 and locks on gate 241 so that its output remains a ZERO. The effect of input 248, which is normally a ZERO, on locking gate 241, will be described below.

When the output of gate 241 changes to ZERO, this will be felt through resistor 261 to gate on clock 250 by changing the input 257 of gate 251. The gated clock 250 then operates at a predetermined frequency, providing a square wave output in a manner well known to those of reasonable skill in the art.

The output of clock 250 is felt through the RC network of capacitor 229 and resistor 228 on the input to inverter 225. The negative going edges of the square wave output will cause the output of inverter 225 to change from its normal ZERO to a ONE. However, the period of time that this change remains is determined by the RC time constant of capacitor 229 and resistor 228, and thus the pulse width as shown in B of FIG. 2 *a* and *b* is determined. In the specific example given above, this pulse width is chosen to be 100 microseconds. This change in output of inverter 225 from a ZERO to a ONE is felt at input 226 of gate 223, and at the count input terminal of counter 270 where it is counted. The result of the positive input at 226 of gate 223 is a change from ONE to ZERO at the output of gate 223 thus causing a change from ZERO to ONE at the output of inverter 224. The positive signal out of inverter 224 will turn on oscillator 230 to provide a burst of pulses at coil 231. This burst of pulses will be on for a period of time determined as described above by capacitor 229 and resistor 228. Thus, short bursts of pulses are transmitted by coil 231 as shown at B in FIG. 2*a*. The pulse repetition rate is determined by clock 250.

As has been described in the discussion of FIG. 1, set counter 40 receives a predetermined number of pulses as shown in FIGS. 2*a* – *c*, and having counted these pulses, then provides outputs at terminals 42 – 48, from which the pacer rate and pulse width are determined. The transmitter of FIG. 3 allows the programming of the pulses into set counter 40 of FIG. 1 through the use of switches 281 and 291, which in conjunction with diodes 282 and 292 and counter 70 determine, respectively, pacer pulse rate and pacer output pulse width. As noted above, counter 270 is reset to an all ZERO state at the time the transmitter sends the code pulse A. Whereafter, when pulses B are being sent, the pulsing output of inverter 225 is received and counted by 270. The wiper arm of, for example, switch 281 will be connected through selected one or more of diodes 282 to the selected ones of counter output terminals 274–277. Following the reset of counter 270, all of outputs 274–277 would be in the ZERO state. Thus, current flow will be felt from power input terminal 303 through resistor 302, through the selective of diodes 282, to the ZERO state at the respective of terminals 274 – 277. Thus, the anode of diode 304 will be in the ZERO state and a ZERO will be felt at input 248 of gate 246, thus keeping the output of gate 246 at a ONE and locking in the ZERO output of gate 241 as described above.

The operation of switch 291, to determine pacer output pulse width operates in the same manner, such that selective of diodes 292 will connect bus 301 to a ZERO until such time as the selective of counter outputs 271 – 273 have all reached a ONE state.

When the output pulses from the transmitter have reached a perdetermined count as determined by counter 270 so that, in the switch selection shown in FIG. 3, for example, all of counter terminals 274 – 277 are in the ONE state, then the positive signal will be felt on the anode of diode 304 causing a ONE signal to appear on input 248 of gate 246. This in turn will cause the output of 246 to go to ZERO, which in turn will be felt at input 245 of gate 241. As input 242 of gate 241 is also in the ZERO state, the output of gate 241 will return to the ONE state. This in turn will be felt on input 247 of gate 246 to lock its output into the ZERO state, thus locking gate 241 into an output ONE state. The output ONE from locking gate 240 will be felt across the combination of capacitor 259, resistor 261 and diode 262 to turn off gate 251 thus shutting down gated clock 250.

In summary, the count of pulses B may be selected through the use of switches 281 and 291. When that count has been reached, the transmitter is turned off and no further pulses are sent. The pulses B will have been received by the pacer shown in FIG. 1, and have properly passed through receiver-filter 10 and decoder 20 to be stored in set counter 40. Set counter 40 is then compared with counter 70 to determine pacer pulse rate and output pulse width.

Figure 4:
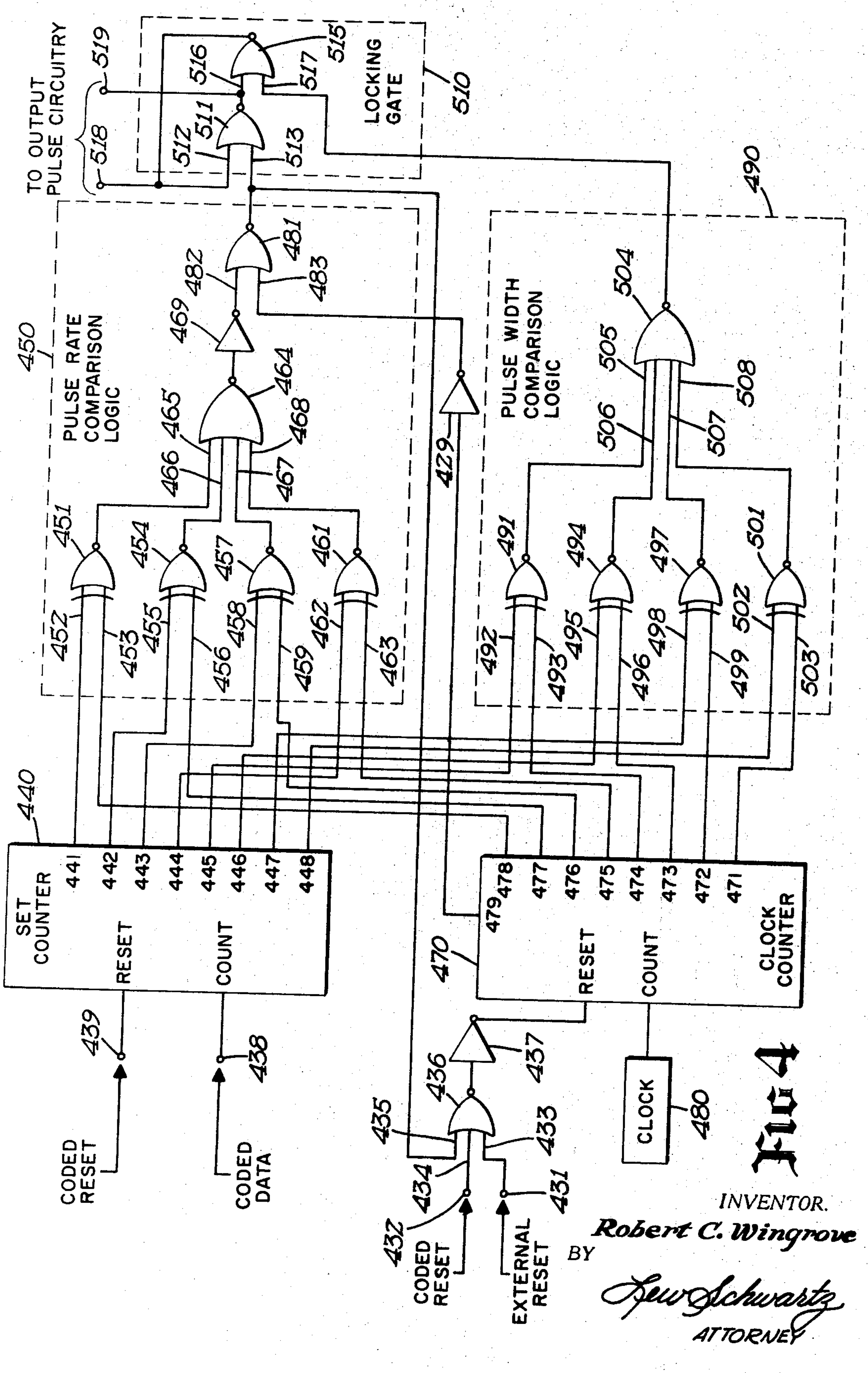
FIG. 4 is another embodiment of the pacer apparatus of this invention.

Referring now to FIG. 4, there is shown a variation of a portion of the pacer apparatus of FIG. 1. FIG. 4 includes a set counter 440 having a reset terminal connected to a terminal 439 adapted to receive the coded reset signal as described in the pacer apparatus of FIG. 1. Counter 440 also has a count terminal connected to a terminal 438 adapted to receive the coded input data, as described in the pacer apparatus of FIG. 1. Counter 440 includes a plurality of output terminals 441, 442, 443, 444, 446, 447 and 448.

FIG. 4 also shows a clock counter 470 having a count terminal connected to a clock 480. Counter 470 also has a reset terminal connected to the output of an inverter 437 which has an input connected to the output of three-input positive NOR logic gate 436. Gate 436 has three inputs, 433, 434, and 435. Input 433 is connected to a terminal 431 adapted to receive an external reset signal, for example, to make the pacer apparatus a demand pacer apparatus. Input terminal 434 is connected to a terminal 432 adapted to be connected to a coded reset input, the same as input terminal 439 described above. Input 435 of gate 436 is connected to the output of an inverter 481. Counter 470 includes output terminals 471, 472, 473, 474, 475, 476, 477, 478 and 479.

There is also shown a pulse rate comparison circuit 450 and a pulse width comparison logic circuit 490, each of which is connected to both of set counter 440 and clock counter 470 for comparing the outputs of the two counters.

Logic circuit 450 includes four two-input exclusive OR gates 451, 454, 457 and 461, as well as a four-input positive NOR logic gate 464, an inverter 469, and a two-input positive NOR logic gate 481.

Gate 451 has an input 452 connected to output 441 of counter 440, and an input 453 connected to output 478 of counter 470. Gate 454 has an input 455 connected to output 442 of counter 440, and an input 456 connected to output 477 of counter 470. Gate 457 has an input 458 connected to output 443 of counter 440, and an input 459 connected to output 476 of counter 470. Gate 461 has an input 462 connected to output 444 of counter 440 and an input 463 connected to output 475 of counter 470. Gate 464 has an input 465 connected to the output of gate 451, an input 466 connected to the output of gate 454, an input 467 connected to the output of gate 457 and an input 468 connected to the output of gate 461. The output of gate 464 is connected to the input of inverter 469. Gate 481 has an input 482 connected to the output of inverter 469 and an input 483 connected to the output of inverter 429.

Referring again to the pulse width comparison logic 490, it is seen that gage 491 has an input 492 connected to the output 445 of counter 440, and an input 493 connected to output 474 of counter 470. Gate 494 has an input 495 connected to output 446 of counter 440, and an input 496 connected to output 473 of counter 470. Gate 497 has an input 498 connected to output 447 of counter 440, and an input 499 connected to output 472 of counter 470. Gate 501 has an input 502 connected to output 448 of counter 440, and an input 503 connected to terminal 471 of counter 470.

Gate 504 has an input 505 connected to the output of gate 491, an input 506 connected to the output of gate 494, an input 507 connected to the output of gate 497 and an input 508 connected to the output of gate 501.

There is also shown in FIG. 4 a locking gate 510, including a pair of two-input positive NOR logic gates 511 and 515. Gate 511 has an input 512 connected to a terminal 518 adapted to be connected to output pulse circuitry for providing a pulse to electrodes adapted to be connected to the heart. Gate 511 also has an input 513 connected to the output of gate 481 and to input 435 of gate 436. Gate 515 has an input 516 connected to the output of gate 511 and to a terminal 519 also adapted to be connected to output pulse circuitry. Gate 515 also has an input 517 connected to the output of gate 504. The output of gate 515 is connected to input 512 of gate 511.

To understand the operation of the embodiment of FIG. 4, it should be recognized that means such as receiver-filter 10 and decoder 20 are used to provide a coded reset to each of counters 470 and 440, and to provide the coded data to memory or set counter 440. Therefore, counter 440 contains selected information relative to pacer rate and pulse width, as was true in the embodiment of FIG. 1. Clock counter 470 receives continuous pulses from clock 480, and when the count in counter 470 compares with that stored in set counter 440, this will be recognized by the separate comparison logic circuits 450 and 490. Counter 470 has its output 479 connected to the inverter 429 for the purposes of establishing a minimum rate for the pacer as did output terminal 76 of counter 70 in FIG. 1.

Referring to the operation of the rate selection circuitry, the outputs of exclusive OR gates 451 – 461 will each be in the ONE state whenever their inputs are not the same. Thus, when the reset of counters 440 and 470 occurs, all of the inputs to gates 451 – 461 will be the same and an output change from each gate will occur. However, output terminal 479 of counter 470 will be reset to ZERO causing a ONE to appear at input 483 of Gate 481 thus inhibiting an output at that time.

As soon as counter 440 starts to count the coded data which immediately follows the coded reset, all of the inputs to each of gates 451 – 461 will not be the same and at least one of such gates will have an output ONE. This one will be felt on the input of gate 464 to keep its output at a ZERO, which causes a ONE to be felt on input 482 of gate 481 causing its output to be a ZERO.

As clock 480 continues to be counted by counter 470, the output of counter 470 on terminals 475 and 478 will eventually compare with those on terminals 441 – 444 of counter 440. However, output 479 will still be a ZERO thus keeping the output of gate 481 at a ZERO and this first comparison of counters 440 and 470 will not result in a signal to the output pulse terminals 518 and 519. Assuming output terminal 479 is the highest count number to be used in the system shown, when clock 480 has been counted to a predetermined value, terminal 479 will switch to a ONE, thus enabling the output gate 481 of comparison circuitry 450. Counter 470 will continue to count clock pulses until terminals 475 through 478 compare with terminals 441 through 444 of counter 440. Thus, the coded input data to counter 440 determines the pacer rate, with terminal 479 of counter 470 determining a minimum rate.

With gate 481 enabled, and with a comparison between terminal 475 – 478 and 441 – 444, all outputs of gates 451 – 461 will go to ZERO thus causing the output of gate 464 to go to a ONE. This one will be felt through inverter 469 to be a ZERO on input 482 of gate 481. As input 483 is also held at a ZERO due to inverter 429 and output terminal 479, the output of gate 481 will switch from its normal ZERO to a ONE state. This ONE will be felt on input 513 of gate 511 and on input 435 of gate 436 to reset counter 470.

The positive signal on input 513 will cause the output of gate 511 to switch from a ONE to a ZERO. This will cause the output of gate 515 to switch from a ZERO to a ONE, which effect will be felt both on output terminal 518 and on input terminal 512 at gate 511 to lock gate 511 to an output ZERO state. Thus, terminals 518 and 519 are switched into the outputs states and locked into those states by locking gate 510.

As stated above, at the time the output signal commenced a reset signal was felt on input 435 of gate 436 to reset counter 470. This has the effect of again disabling comparison logic circuitry 450 by resetting output 479 to ZERO and of starting the count process over again for counter 470. When sufficient clock pulses have been counted by counter 470 for outputs 471–474 to compare with outputs 445 – 448 of counter 440, then the outputs of each of gates 491 – 501 of comparison logic circuitry 490 will switch to the ZERO state. This causes gate 504 to have an output switch from its normal ZERO to a ONE state. This ONE is felt on input 517 of gate 515 to unlock its output from the ONE state to the ZERO state. This ZERO is felt on output terminal 518 and on the input 512 of gate 511 to lock circuitry 510 into its original state and turn off the output pulse. Thus, the output pulse width is obtained by comparison of portions of counters 440 and 470, in the same way that pulse rate is determined.

It will be apparent that the above described action is repeatable for permanent automatic stimulation of the heart. The minimum pulse rate will be determined by output terminal 479 and its count level, while the adjustable pacer output pulse rate will be determined by an input to memory 440. Each time memory 440 commences a pulse, that pulse will be stopped after a period of time determined by another portion of memory 440 being compared with the count and clock counter 470.

It should also be recognized that means for sensing cardiac beats can be used to provide a reset signal to external reset terminal 431. These means are well known to those skilled in the art, and would result in the pacer in FIG. 4 being switched to use as a demand pacer, because a timed reset from normal cardiac operation to counter 470 would keep terminal 479 in the ZERO state thus preventing the commencing of any output pulse for artificial stimulation of the heart.

It has also been recognized that a much finer selection of pulse rate and pulse width can be achieved by using counters having, for example, 14 states in combination with a clock such as clock 480 having an output frequency in excess of 15,000 Hz.

From the foregoing descriptions of the preferred embodiments of this invention, it will be apparent that the apparatus is indeed useful for medical-electronic devices other than cardiac pacers. It is not intended that the scope of this invention be so limited. It will also be apparent that that portion of the apparatus, for example, which is used to selectively store information for determining and changing pulse width can be used for varying other perameters of the pacer output pulse. For example, counter 40 output terminals 46 – 48 could be connected to a series of batteries which supply power for the output pulse, and could selectively switch certain of the batteries in series with each other according to the information stored in counter 40, to thus vary the amplitude of the output signal.

What is claimed is:

1. Electro-medical stimulation apparatus comprising: first and second binary data storage means; means for selectively changing data stored in the first storage means; means for continually changing data stored in the second storage means at a predetermined rate; means for comparing at least portions of data stored in the first and second storage means and for providing signals in the presence of a predetermined comparisons; and means connected to receive the signals from the means for comparing for providing stimulation signals.

2. The apparatus of claim 1 including: means connected to the first storage means for controlling the width of the stimulation signals according to at least a portion of the data stored in the first storage means.

3. The apparatus of claim 1 including: means connected to the first storage means for controlling the amplitude of the stimulation signals according to at least a portion of the data stored in the first storage means.

4. The apparatus of claim 1 in which the means for selectively changing the data stored in the first storage means includes: receiver and decoder means connected to the first storage means.

5. The apparatus of claim 4 including the combination: transmitter and encoder means for transmitting coded signals to the receiver and decoder means.

6. The apparatus of claim 1 including: further means for comparing at least other portions of data stored in the first and second storage means and for providing a signal in the presence of a predetermined comparison; means connecting the further means for comparing to the means for providing a stimulation signal; and the means for providing a stimulation signal having means responsive to a signal from the means for comparing for starting a stimulation signal, and having means responsive to a signal from the further means for comparing for stopping the stimulation signal.

7. Apparatus for providing electro-medical stimulation pulses comprising: clock means having a pulsed output signal; first counter means connected to count the output of the clock means; further counter means for receiving and storing a predetermined count; comparison logic means for continually comparing the counts in the first and further counter means to provide a polarity of signals; and stimulation circuit means controlled by the plurality signals for providing stimulation signals.

8. The apparatus of claim 7 including: means for receiving pulse signals; and means connecting the means for receiving to the further counter means.

9. The apparatus of claim 8 including: means for transmitting pulse signals; and means connected to the means for transmitting for varying the number of pulses transmitted.

10. The apparatus of claim 9 including: means connected to the means for transmitting for encoding the transmitted pulse signals; and means connected to the means for receiving for decoding the transmitted pulse signals.

11. Digital apparatus for electro-medical stimulation comprising: first binary counter means having input terminal means, reset terminal means and output terminal means; second binary counter means having input terminal means and output terminal means; data input means connected to the first counter input terminal means and reset terminal means; binary clock means connected to the second counter input terminal means; logic circuit means having input terminal means and output terminal means; means connecting a portion of the first and second binary counter output terminal means to the logic circuit means input terminal means; output circuit means adapted to be connected to a portion of a body; and means connecting the logic circuit means output terminal means to the output circuit means.

12. The apparatus of claim 11 in which said second binary counter includes reset terminal means connected to said output circuit means.

13. The apparatus of claim 11 including: inhibit means included in the output circuit means further of the second binary counter output terminal means connected to the output circuit means inhibit means for inhibiting operation of the output circuit means until a minimum count is reached in the second binary counter means.

14. The apparatus of claim 11 including: output pulse width control means; and means connecting the output pulse width control means between the output circuit means and a further portion of the first binary counter output terminal means.

15. The apparatus of claim 14 in which the output pulse width control means comprises: monostable multivibrator means, means for adjusting the period of oscillation of the monostable multivibrator means; and means connecting the means for adjusting to the further portion of the first binary counter output terminal means for controlling the period of oscillation according to the binary states of the further portion of the first binary counter output terminal means.

16. The apparatus of claim 11 in which the logic circuit means includes: a plurality of logic gates having input terminal means and output terminal means; each of the logic gates having a portion of its input terminal means connected to a portion of the first binary counter output terminal means, and having a further portion of its input terminal means connected to a portion of the second binary counter output terminal means; and means connecting the logic gates output terminal means to the logic circuit means output terminal means.

17. The apparatus of claim 11 including: second logic circuit means having input terminal means and output terminal means; means connecting a further portion of the first and second binary counter output terminal means to the second logic circuit means input terminal means; and means connecting the second logic circuit means output terminal means to the output circuit means.

18. The apparatus of claim 17 in which the output circuit means includes: means responsive to the logic circuit means for starting an output signal; and means responsive to the second logic circuit means for stopping the output signal.

19. The apparatus of claim 11 in which the data input means includes: RF receiver and decoder means.

20. The apparatus of claim 19 including in combination: RF transmitter and encoder means.

21. The apparatus of claim 20 in which the RF transmitter and encoder means includes: enabling means; RF oscillator means having a transmission coil; code logic means connecting the enabling means to the oscillator means for providing a first timed period of oscillation when the enabling means is actuated; further binary counter means; further binary clock means; means connecting the further clock means between the enabling means and the further counter means and to the code logic means; means connecting the further counter means to the code logic means; means for commencing a plurality of further timed periods of oscillation in response to the output pulses of the further clock means; means connected to the further counter means for stopping the further timed periods of oscillation until the enabling means is again actuated; and selection means connected to the further counter means for selecting a desired number of the further timed periods of oscillation.

22. The apparatus of claim 21 in which the RF receiver and decoder means includes: means for detecting the first timed period of oscillation; further code logic means connected to the means for detecting and enabled thereby only where a pulse of the first timed period and frequency of oscillation is detected; the means for detecting and the further code logic means also for detecting the further timed periods of oscillation and for providing a binary count signal to the input terminal means of the first binary counter means for each such further timed period occurring within a predetermined time.

23. In implantable cardiac pacer apparatus, including electrode means adapted to be connected to a heart and circuit means for providing electrical impulses on the electrode means, the improvement comprising: electrical storage means for storing programs and having at least first and second storage portions; means for receiving remotely sent programs connected to the first storage portion; clock means; means connecting the clock means to the second storage portion; means for comparing programs stored in the first and second storage portions for providing signals; means for connecting the means for comparing between the first and second storage portions and the circuit means, for controlling the electrical impulses according to the stored program; and all said means encapulated in means substantially inert to body fluids and tissue.

24. The apparatus of claim 23 in which the means for receiving remotely sent programs comprises: means for receiving and decoding transmitted RF signals.

25. The apparatus of claim 24 including in combination: means for transmitting coded RF signals representative of a storable electrical program.

* * * * *